Oct. 2, 1928.
C. J. FECHHEIMER
1,685,993
STABILIZATION OF TRANSMISSION LINES
Filed Jan. 23, 1923
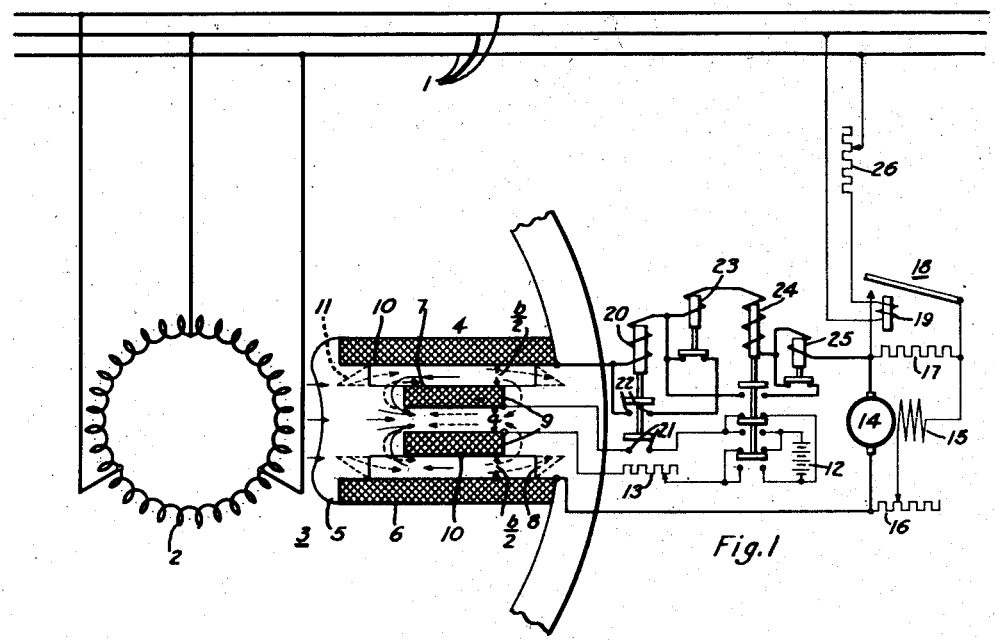
Fig.1
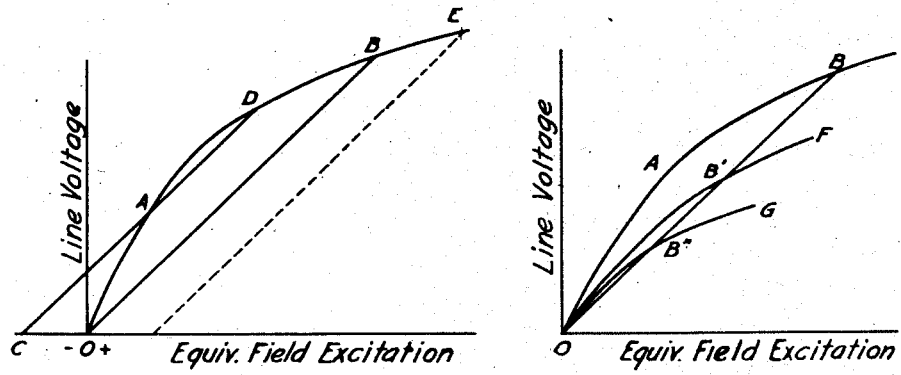
Fig.2.
Fig.3.
WITNESSES:
INVENTOR
Carl J. Fechheimer
BY
ATTORNEY Patented Oct. 2, 1928.

1,685,993

UNITED STATES PATENT OFFICE.

CARL J. FECHHEIMER, OF PITTSBURGH, PENNSYLVANIA, ASSIGNOR TO WESTINGHOUSE ELECTRIC & MANUFACTURING COMPANY, A CORPORATION OF PENNSYLVANIA.

STABILIZATION OF TRANSMISSION LINES.

Application filed January 23, 1923. Serial No. 614,371.

My invention relates to transmission lines and it has particular relation to methods and apparatus for utilizing synchronous alternating-current machines to limit the voltage on high-reactance transmission lines.

The principal object of my invention is to provide a novel method and apparatus whereby the voltage of highly reactive transmission lines may be reduced or controlled by means of a synchronous machine without unduly increasing the kilovolt-ampere overload of the machine, the invention consisting in changing the shape of the saturation curve without resorting to negative field-magnet excitation.

With these and other objects in view, my invention relates to details of apparatus and methods of manipulation described in the following specification and illustrated in the accompanying drawing, wherein Figure 1 is a diagrammatic view of circuits and apparatus showing my invention applied to an automatic regulating system, and Figs. 2 and 3 are curve diagrams illustrating the operative principle.

In controlling the voltage of long high-voltage transmission lines by means of a single synchronous machine, it frequently happens that the leading wattless current drawn by the line is so large as to require the field magnets of the machine to be reversed in order to prevent the voltage from reaching abnormally high values and greatly overloading the machine.

Furthermore, it sometimes becomes necessary to reduce the voltage of the line in order to tie in other synchronous apparatus at a distant point and in such cases, it has frequently been very difficult to obtain the necessary reduced voltage without employing more than one machine at the controlling station. If the excitation of the synchronous machine is controlled by varying the voltage of an exciter or group of exciters and the excitation voltage is reduced to zero in order to control the line voltage, a sudden increase in load on the line may cause the synchronous machine to pull out of step and operate asynchronously as an induction machine.

Furthermore, if a negative excitation is applied to the exciting windings, it is possible that a point of instability will be reached wherein the polarity of the machine may be reversed and the voltage will then build up to a very high value with the reversed polarity.

The operation of a synchronous machine under such circumstances is illustrated in Fig. 2 wherein is shown the saturation curve of a synchronous machine, the terminal voltage being plotted against the field excitation. When the machine is supplying leading wattless current, the armature reaction produces an excitation which may be plotted as an equivalent field excitation and the curve shown in Fig. 2 may thus be taken to represent the line voltage of a transmission line having high condensive reactance connected across the terminals of an unexcited synchronous machine.

If the curve OADBE is the saturation curve of the machine and the straight line OB represents the capacity charging current of the line expressed in terms of equivalent field excitation, it will be obvious that the line voltage has a fixed value determined by the intersection of the two curves and that the operation is stable. If, however, an attempt is made to operate the machine at a voltage A near the knee of the curve or below the knee of the curve, a negative field being employed for this purpose, it will be evident that the operation is not stable, since the slightest departure of the conditions from an exactly perfect balance between the terminal voltage of the machine and the line voltage corresponding to the same equivalent field excitation will cause the voltage either to build up to the point D or to drop down to zero and to build up in the opposite polarity to a very high value indicated at E.

In order to overcome this objectionable operation, I have adopted the expedient of changing the shape of the characteristic curve of the machine in order to secure low voltage conditions when supplying a relatively large capacitance charging current. Thus, in Fig. 3, if the curve OAB represents the normal magnetization curve of the machine, and if the effective cross section of the magnetic path is reduced, a second curve OB'F will be obtained lying below the first curve. A still lower magnetization curve OB''G may be obtained by still further increasing the saturation effects of the magnetic field circuits. Thus, if the machine is operated without excitation, three voltages B, B' and B'' may be obtained without any exciting current on the field windings, and other voltages may be obtained by adding a positive exciting current, as will be obvious.

In Fig. 1, I have illustrated one particular means for varying the shape of the magnetization curve of a synchronous machine, while the same is operatively connected to a transmission line which draws a large capacitance charging current. It is to be understood, however, that any other means for producing saturation or changing the magnetization curve may be substituted. Connected to the three-phase transmission line 1 is an armature winding 2 of a synchronous machine 3 having a field-magnet structure 4. The field magnet structure 4 is any desired excitation system such as a field magnet provided with salient-poles 5, one of which is shown, having an exciting winding 6 thereon, and having an auxiliary winding 7 imbedded therein in such manner that the magnetizable material of the pole piece lies outside of, as well as inside of the auxiliary coil.

The auxiliary winding 7 may be conveniently applied by cutting out opposing notches 8 in the pole piece 5 and cutting additional smaller notches 9 in the bottoms of the first-mentioned notches. The auxiliary winding may then be wound directly into the smaller notches 9 and the larger notches 8 may be closed by adding iron pieces 10 which may be held in place by dove-tails 11, as indicated.

If the exciting flux threading the armature and the field magnet structure is in the direction indicated by the arrows placed on the pole face, the auxiliary coil 7 may be energized either to increase the flux-density in the cross-sectional area $a$ within the coil 7 as indicated by the full-line arrows or, if the excitation of the auxiliary coil is reversed, the flux-density may be increased in the cross-sectional areas $b/2$ afforded by the magnetizable members 10 as indicated by the dotted arrows.

It will be noted that the total flux is not varied by the auxiliary coil 7 except in so far as the reluctance of the magnetic path is varied by the changes in the distribution of the flux therein. The cross-sectional areas $a$ and $b$ may be made equal, in which case the change in flux would be substantially the same regardless of the polarity of the auxiliary exciting winding. As indicated in the drawing, however, the cross-sectional areas $a$ and $b$ may be different, in which case the reluctance of the field magnet structure may be changed simply by reversing the excitation of the auxiliary coil without varying the magnitude of the current flow therethrough.

In operation, the voltage of the machine will be normally controlled by varying the excitation of the main exciting windings 6. If, however, the excitation has been reduced to zero, or to a predetermined minimum value necessary to prevent asynchronous operation and a still further reduction in voltage is desired, the exciting coil 7 may be energized from a direct-current source 12 through a suitable rheostat 13, whereby the saturation of the cross-sectional area $a$ or $b$ may be varied, and the magnetizing current or inductance current drawn by the machine from the line is increased. Thus, the saturation of the field core in this case, produces substantially the effect of an additional inductance across the line.

The operations just described may be carried out by hand but any form of automatic regulating mechanism may be employed. By way of illustration, I have shown an automatic arrangement whereby the main exciting coil 6 is energized from an exciter 14 having a field-magnet winding 15 energized across the terminals of the exciter through a rheostat 16 and a regulating resistor 17. The resistor 17 is shunted by a voltage regulator diagrammatically shown at 18, which may be in the form of a Tirrill regulator having a voltage coil 19 energized from one phase of the line.

When the exciting current has fallen to a predetermined minimum value, current limit relay 20 operates to close contacts 21 and thus to connect the auxiliary winding 7 across the source 12. The regulator 19 will then take up the control increasing the main field excitation and controlling the same to maintain the desired voltage. Premature opening of the relay 20 is avoided by means of auxiliary contacts 22 thereon, which close a shunt circuit around the energizing coil of the relay. The shunt circuit just mentioned is, in turn, opened by means of a second current limit switch 23 which operates to open the shunt circuit around the switch 20 and thus to de-energize the auxiliary coil 7 after the main exciting current has increased to a predetermined value.

If, while the relay 20 is closed, the automatically regulated exciting current again falls to a predetermined low value, a relay 24 is actuated to reverse the polarity of the auxiliary winding 7 and, at the same time, to close a shunt circuit around the exciting coils of both the relays 23 and 24, said shunting circuit being opened, upon a predetermined increase of the main exciting current, by means of another current limit switch 25, as indicated.

In operation, if it is desired to reduce the voltage, a regulating resistor 26 in circuit with the voltage regulator 18 may be operated to cause the regulator to maintain a reduced voltage. The main exciting current through the windings 6 will then decrease until a point is reached at which the relay 20 will be released to energize the auxiliary coil 7 in such directions as to send a larger portion of the flux through the cross-section area $b$, as indicated by dotted arrows. The shape of the saturation curve of the machine will thus be changed and the main field excitation will be slightly increased in order to maintain the proper voltage, the relay 20 being maintained in down position by means of the shunting circuit provided by the auxiliary contacts 22, as described.

If while the voltage is held constant by the regulator, the leading current drawn by the line should thereafter be reduced to such a point that the exciting current is automatically increased to a predetermined value, the relay 23 will operate to open the shunt around the exciting relay 20 and thus to cause said exciting coil to open the relay 20. If, however, the leading wattless current increases while the voltage is maintained constant or, if the line reactance remains unchanged but the voltage is decreased by a further adjustment of the voltage regulating rheostat 26 and the exciting current again falls to a predetermined value, which might be slightly lower than the value at which the relay 20 is reelased, the relay 24 will drop to reverse the excitation of the auxiliary coil 7 without changing the value of the current therethrough, thus causing the flux to concentrate in the small area $a$, as indicated by the full-line arrows in Fig. 1, thereby still further increasing the reluctance of the magnetic path and thus assisting to reduce the line voltage, as explained in connection with Fig. 3.

While I have described my invention in particular as applied to an illustrative automatic system, it is obvious that many other arrangements of automatic control could be devised by those skilled in the art, and also that the operation can be controlled entirely by hand, as pointed out in the explanation of the principles. I desire, therefore, that my invention shall be construed to include all such modifications and equivalents as fall within the language of the claims when read in the light of the prior art.

I claim as my invention:

1. The combination with an alternating-current line, of a synchronous dynamo-electric machine comprising an armature connected to said line and a field member, means for supplying direct-current excitation to said field member, means for controlling said excitation to maintain predetermined voltage conditions across the terminals of said machine and means for automatically increasing the reluctance of the magnetic circuits of said machine to prevent a decrease of the direct-current excitation below a predetermined value.

2. The combination with an alternating-current transmission line, of a synchronous dynamo-electric machine connected thereto and a voltage-responsive mechanism for limiting the voltage thereof, said mechanism comprising means for variably exciting said machine from a maximum value to a predetermined minimum value and means operable upon the occurrence of said predetermined minimum value for varying the reluctance of the magnetic circuits of said machine.

3. The combination with an alternating-current means having a condensive reactance, of a salient-pole synchronous machine operable to control the voltage of said means, and means for causing the flux distribution across a cross-section of the field-magnet member to vary in order to vary the effective cross-sectional area without varying the magnetizing field ampere-turns.

4. A synchronous machine having a magnetizable salient-pole field-magnet member, coils imbedded in said member in such manner that a complete magnetic circuit is provided outside and inside of said coils, the cross-sectional area of the magnetizable material within said coils being different from the sum of the areas outside thereof, and means for reversing the polarity of said coils.

5. The combination with an alternating-current line, of a synchronous dynamo-electric machine connected thereto, an automatic voltage regulator associated with said machine for controlling the voltage of said line, and electro-responsive means responding to low excitation conditions in said machine for producing substantially the effect of an auxiliary inductance connected in parallel to said machine to supply charging current to said line.

6. The combination with an alternating-current line, of a synchronous dynamo-electric machine connected thereto, an automatic voltage regulator associated with said machine for controlling the voltage of said line, and electro-responsive means responding to exciter-circuit conditions for limiting the decrease of the exciting current necessary to maintain desired voltage conditions on the line.

7. The combination with an alternating-current line, of a synchronous dynamo-electric machine comprising an armature connected to said line and a field member having a plurality of salient poles, main exciting windings surrounding the entire cross-section of said poles, means for regulating the current in said exciting windings to control the voltage of said machine, auxiliary windings interlinked with only a portion of the cross-section of said poles, and means for exciting said auxiliary windings to maintain a minimum direct-current excitation in said main exciting windings.

8. The combination with an alternator having an armature and a field member, of electro-responsive means for temporarily saturating a portion of the magnetic circuit of said alternator, said means being responsive to the conditions producing a voltage rise at the armature terminals during leading-current operation.

9. The combination of a constant-voltage synchronous dynamo-electric machine comprising an armature and a field member, a main exciting winding for said field member, means for supplying direct current to said exciting winding, an auxiliary winding upon said field member to distort the flux distribution produced by said exciting winding without substantially affecting the magneto-motive force producing the main flux of said machine, means regulating the direct current supplied to the exciting winding to maintain constant voltage, and means for causing said machine to require a variable direct current excitation for the same armature current.

10. The combination with an alternating-current line, of a synchronous dynamo-electric machine comprising an armature connected to said line and a field member having a plurality of salient poles, main exciting windings surrounding said poles to produce the main flux of said machine, means for supplying direct current to said exciting windings, auxiliary direct-current excited windings on said field member to distort the flux distribution produced by said exciting windings without substantially affecting the magneto-motive force producing the main flux of said machine, said auxiliary windings being so mounted as to produce quantitatively different degrees of distortion for the same current flowing therein, depending on the polarity of the current flow therein.

11. The combination with a synchronous dynamo-electric machine and a long transmission line connected to said machine, of an exciter for said machine, voltage-responsive means for regulating the exciter current, and electro-responsive means for automatically changing the ratio between the combined exciting ampere-turns of field and armature and the terminal voltage of the machine in response to conditions which would otherwise have necessitated a reduction of the exciter current below a predetermined value.

12. The combination of a constant-voltage synchronous dynamo-electric machine comprising an armature and a field member, a main exciting winding for said field member, means for supplying direct current to said exciting winding, means for controlling said current to maintain predetermined voltage conditions in said machine, an auxiliary winding upon said field member in such position as, when energized, to distort the flux distribution produced by said exciting winding, and electro-responsive means for so exciting said auxiliary winding as to distort the flux distribution in the synchronous machine upon a decrease of the direct current in said exciting winding to a predetermined value below which stable operation of said machine would be jeopardized.

In testimony whereof, I have hereunto subscribed my name, this 20th day of January, 1923.

CARL J. FECHHEIMER.